(12) United States Patent
Kendrick et al.

(10) Patent No.: US 11,548,239 B2
(45) Date of Patent: Jan. 10, 2023

(54) BONDING PROCESS AND SYSTEM

(71) Applicant: Textron Innovations, Inc., Providence, RI (US)

(72) Inventors: Phillip Anthony Kendrick, Wichita, KS (US); Lawrence Arthur Gintert, Andover, KS (US); Herbert Lee Skidmore, Viola, KS (US); Mike Preston McKown, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 191 days.

(21) Appl. No.: 17/028,050

(22) Filed: Sep. 22, 2020

(65) Prior Publication Data

US 2021/0001570 A1    Jan. 7, 2021

Related U.S. Application Data

(62) Division of application No. 15/702,068, filed on Sep. 12, 2017, now Pat. No. 10,800,112.

(Continued)

(51) Int. Cl.
*B29C 70/30* (2006.01)
*B33Y 80/00* (2015.01)
(Continued)

(52) U.S. Cl.
CPC ........ *B29C 70/302* (2021.05); *B29C 37/0082* (2013.01); *B29C 65/48* (2013.01);
(Continued)

(58) Field of Classification Search
CPC ..... B29C 35/02; B29C 37/0082; B29C 65/48; B29C 66/1122; B29C 66/21;
(Continued)

(56) References Cited

U.S. PATENT DOCUMENTS

| 1,252,012 | A | 1/1918 | Meier |
| 2,366,274 | A | 1/1945 | Luth et al. |

(Continued)

FOREIGN PATENT DOCUMENTS

| CN | 1383896 A | 12/2002 |
| CN | 1334927 B | 5/2011 |

(Continued)

OTHER PUBLICATIONS

Thummalapalli, Vimal Kumar, "Joining of Advanced Composites," University of Dayton, published Dec. 2010.
(Continued)

*Primary Examiner* — Philip C Tucker
*Assistant Examiner* — Brian R Slawski
(74) *Attorney, Agent, or Firm* — Avek IP, LLC

(57) ABSTRACT

A system and process for bonding involves a pocket made into one article is used to secure that article to another using a flowable, curable material (e.g., resin) which during saturation enters through a passageway and at least partially fills the void. When the article is cured, the article is bonded to another article to which resin has also been applied since the void (now containing cured material) is larger than the passageway.

16 Claims, 5 Drawing Sheets

Related U.S. Application Data

(60) Provisional application No. 62/393,214, filed on Sep. 12, 2016.

(51) Int. Cl.

| | | |
|---|---|---|
| *B29C 37/00* | (2006.01) | |
| *B33Y 10/00* | (2015.01) | |
| *B29C 65/48* | (2006.01) | |
| *B29C 65/00* | (2006.01) | |
| *B29C 35/02* | (2006.01) | |
| *B32B 7/08* | (2019.01) | |
| *B32B 37/12* | (2006.01) | |
| *B32B 3/30* | (2006.01) | |
| *B32B 7/05* | (2019.01) | |
| *B32B 7/14* | (2006.01) | |
| *B29K 101/12* | (2006.01) | |
| *B29L 31/30* | (2006.01) | |

(52) U.S. Cl.
CPC ............... *B33Y 10/00* (2014.12); *B33Y 80/00* (2014.12); *B29C 35/02* (2013.01); *B29C 66/1122* (2013.01); *B29C 66/21* (2013.01); *B29C 66/30325* (2013.01); *B29C 66/322* (2013.01); *B29C 66/71* (2013.01); *B29C 66/729* (2013.01); *B29C 66/7212* (2013.01); *B29C 66/72141* (2013.01); *B29C 66/72523* (2013.01); *B29C 66/7392* (2013.01); *B29C 66/7394* (2013.01); *B29C 66/73921* (2013.01); *B29K 2101/12* (2013.01); *B29L 2031/3076* (2013.01); *B32B 3/30* (2013.01); *B32B 7/05* (2019.01); *B32B 7/08* (2013.01); *B32B 7/14* (2013.01); *B32B 37/1292* (2013.01); *B32B 2037/1215* (2013.01); *B32B 2037/1253* (2013.01)

(58) Field of Classification Search
CPC . B29C 66/30325; B29C 66/322; B29C 66/71; B29C 66/7212; B29C 66/72141; B29C 66/72523; B29C 66/729; B29C 66/73921; B29C 66/7394; B29C 70/30; B29K 2101/12; B29L 2031/3076; B32B 2037/1215; B32B 2037/1253; B32B 3/30; B32B 37/1292; B32B 7/05; B32B 7/08; B32B 7/14; B33Y 10/00; B33Y 80/00
USPC ............ 156/60, 91, 92, 242, 244.11, 244.13, 156/244.15, 244.16, 244.22, 244.24, 156/244.25, 245, 277, 290, 291, 292, 293, 156/305, 308.2, 308.4, 309.6, 244.27, 156/196; 428/156, 161, 162, 163, 166; 138/147; 264/271.1, 273, 274, 279
See application file for complete search history.

(56) References Cited

U.S. PATENT DOCUMENTS

| | | |
|---|---|---|
| 3,899,166 A | 8/1975 | Behn |
| 4,532,166 A | 7/1985 | Thomsen et al. |
| 5,244,746 A | 9/1993 | Matsui et al. |
| 5,310,434 A | 5/1994 | Vives et al. |
| 5,508,096 A | 4/1996 | Van Skyhawk |
| 5,935,475 A | 8/1999 | Scoles et al. |
| 5,976,670 A | 11/1999 | Fugazzi |
| 6,406,636 B1 * | 6/2002 | Vaganov ............. H01L 21/2007 216/36 |
| 6,511,742 B1 | 1/2003 | Mussig et al. |
| 6,528,141 B1 | 3/2003 | Watson et al. |
| 7,998,834 B2 | 8/2011 | Kim et al. |
| 2005/0100727 A1 * | 5/2005 | Yokouchi ................. B32B 3/10 428/317.1 |
| 2005/0276945 A1 | 12/2005 | Muggli et al. |
| 2011/0059290 A1 | 3/2011 | Gage et al. |
| 2012/0255870 A1 | 10/2012 | Rebak et al. |
| 2013/0082144 A1 * | 4/2013 | Lang ..................... B29C 65/565 428/319.1 |
| 2013/0287994 A1 * | 10/2013 | Dietmar ................. B29C 70/86 156/60 |
| 2016/0121545 A1 | 5/2016 | Farris et al. |

FOREIGN PATENT DOCUMENTS

| | | | |
|---|---|---|---|
| DE | 1479111 A1 | 6/1965 | |
| DE | 4444546 A1 * | 7/1995 | ............ B29C 65/54 |
| DE | 10237322 A1 * | 3/2004 | ............ B29C 65/48 |
| DE | 202013100990 U1 * | 7/2014 | ............ E02D 31/02 |
| EP | 0353510 A1 * | 2/1990 | |
| EP | 1750123 A2 | 2/2007 | |
| GB | 694964 A | 7/1953 | |
| GB | 936232 A | 9/1963 | |
| GB | 2043761 A * | 10/1980 | ......... B29C 65/5071 |
| JP | 59101312 U | 11/1982 | |
| JP | 2004351154 A * | 12/2004 | |
| WO | 8701332 A1 | 3/1987 | |

OTHER PUBLICATIONS

PCT Patent application PCT/US2017/051132 International Search Report and Written Opinion dated Jan. 4, 2018.

\* cited by examiner

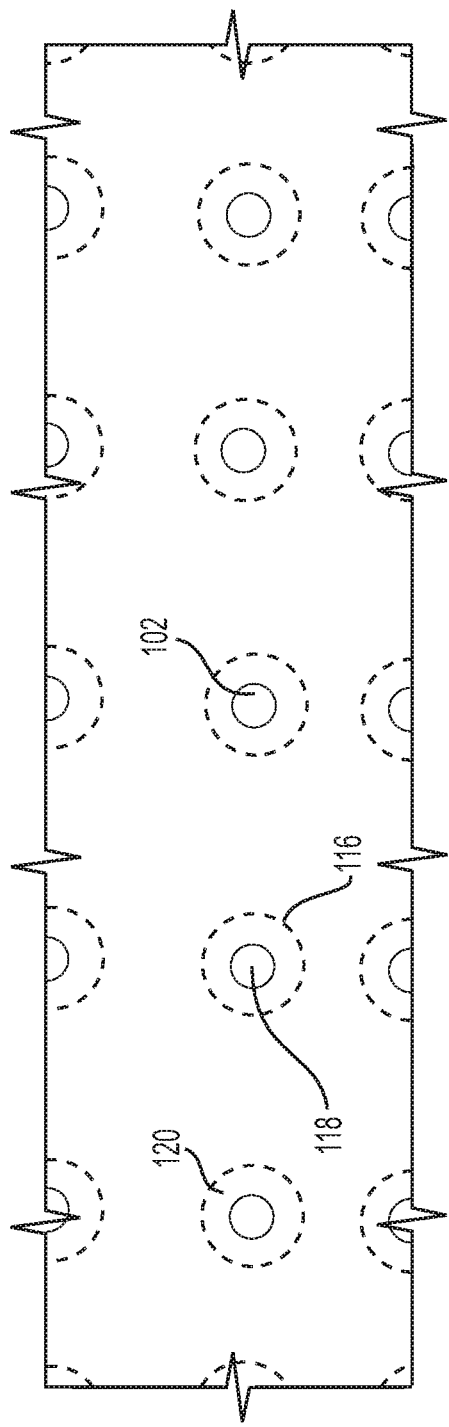

BONDING PROCESS AND SYSTEM

CROSS-REFERENCE TO RELATED APPLICATIONS

This application is a divisional application of U.S. patent application Ser. No. 15/702,068 entitled "Bonding Process And System" filed Sep. 12, 2017, now U.S. Pat. No. 10,800,112, which claims the benefit of U.S. Provisional Application No. 62/393,214 entitled "Bonding Process and System" filed on, Sep. 12, 2016, which is herein incorporated by reference in its entirety.

BACKGROUND OF THE INVENTION

1. Field of the Invention

The invention relates generally to the field of bonding composite materials to other materials. More specifically, the invention relates to bonding surfaces, e.g., overlapping edges of adjacent composite panels using an insert comprised of a non-composite material.

2. Description of the Related Art

It is known to secure composite materials to other non-composite structures using fasteners, adhesives, and epoxies. In order to help create the bond, sometimes the surface of the non-composite material is roughened at the location of the opposing surfaces intended for bonding using grit blasting, sanding, etching or other methods. In other instances, the bonding has been done through ultrasonic or hot-plate welding to enable crosslinking between the surfaces.

In instances the connection to the structure can be made by including the other structure in the layup process and to create the attachment upon curing. When this is the process, it is known to rough an area on the structure using grit blasting, sanding, etching, or some other method, and then receive an edge of the wet composite layup onto the roughened area, and then cure the article.

In these instances, once the article is cured, a bond is created, but there is a tendency for the composite to disbond.

SUMMARY

A process is disclosed involving: providing a first material; growing a part of a second material where the part has at least one surface; defining at least one pocket in the part, and further defining a passageway from the pocket to the surface; then applying the first material onto the surface of the part and introducing the part to a flowable, curable substance which enters the pocket through the passageway; and curing the substance to create a bond between the first and second materials. In embodiments, the first material is a fiber system. In embodiments, the substance is one of a thermoset resin and a thermoplastic resin. In embodiments, the growing step is executed using one of a 3-D printing, a composite layup, and a casting process. In embodiments, the step of defining pocket in the part involves sizing the pocket to have a cross-sectional dimension larger than a dimension of the passageway such that the substance will be retained within the pocket after being cured.

The process might be a fastening process including the steps of: configuring a first article such that a first attachment surface of the second article defines a first passageway leading into a first void formed into and underneath the first attachment surface; sizing a void cross section in the first void to have a dimension that is greater than at least a portion of a cross sectional dimension in the first passageway; causing a curable fluid to be introduced into the first passageway and then into the first void to at least partially fill the first void; and curing the fluid to secure the first article to the second article. In embodiments, the process involves configuring a second surface of the first article to have a second void configured according to the same process as used to configure the first void; and introducing the curable fluid into the second void to secure the first article to a third article. In embodiments, there is a step of saturating the second article with the curable fluid before the curing step. In embodiments, the process involves providing a fiber material in a process of constructing the second article; and completing the second article in executing the curing step creating a first integrated connection between a body of the second article and the first void via a first cured mass of the curable fluid. In embodiments, the process involves providing the fiber material in a process of constructing the third article; and completing the third article in one of: (i) executing the curing step; and (ii) executing an additional curing step; to create a second integrated connection between a body of the third article and the second void via a second secured mass of the curable fluid. In embodiments, the process may involve using the first article to secure the second and third articles together to form an aircraft part. In embodiments, the configuring step could include growing a material layer by layer to form the first article such that the first void and first passageway are included in the article. In embodiments, the growing step is executed using a 3-D printing process. In embodiments, the first article is constructed using a 3-D printing process; and the second article is constructed of composite materials.

A system is also disclosed for securing a composite material to a substrate. This system comprises: an opening made into the substrate material, the opening transitioning into a void formed underneath a surface of the substrate material; the void having a lateral dimension that is greater than a dimension of the opening, thus creating a dimensional difference; a bond formed between the composite and substrate materials, the bond being formed of a cured product of the fluid, the bond being at least enhanced by a retaining force provided by the dimensional difference. In embodiments, the bond is primarily held to the composite material by adhesive strength, and the bond is primarily held to the substrate material by the retaining force provided by the dimensional difference.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3B is a view of a passageway to a void as would be seen from a view above the bonding surface;

DETAILED DESCRIPTION

Figure 1:
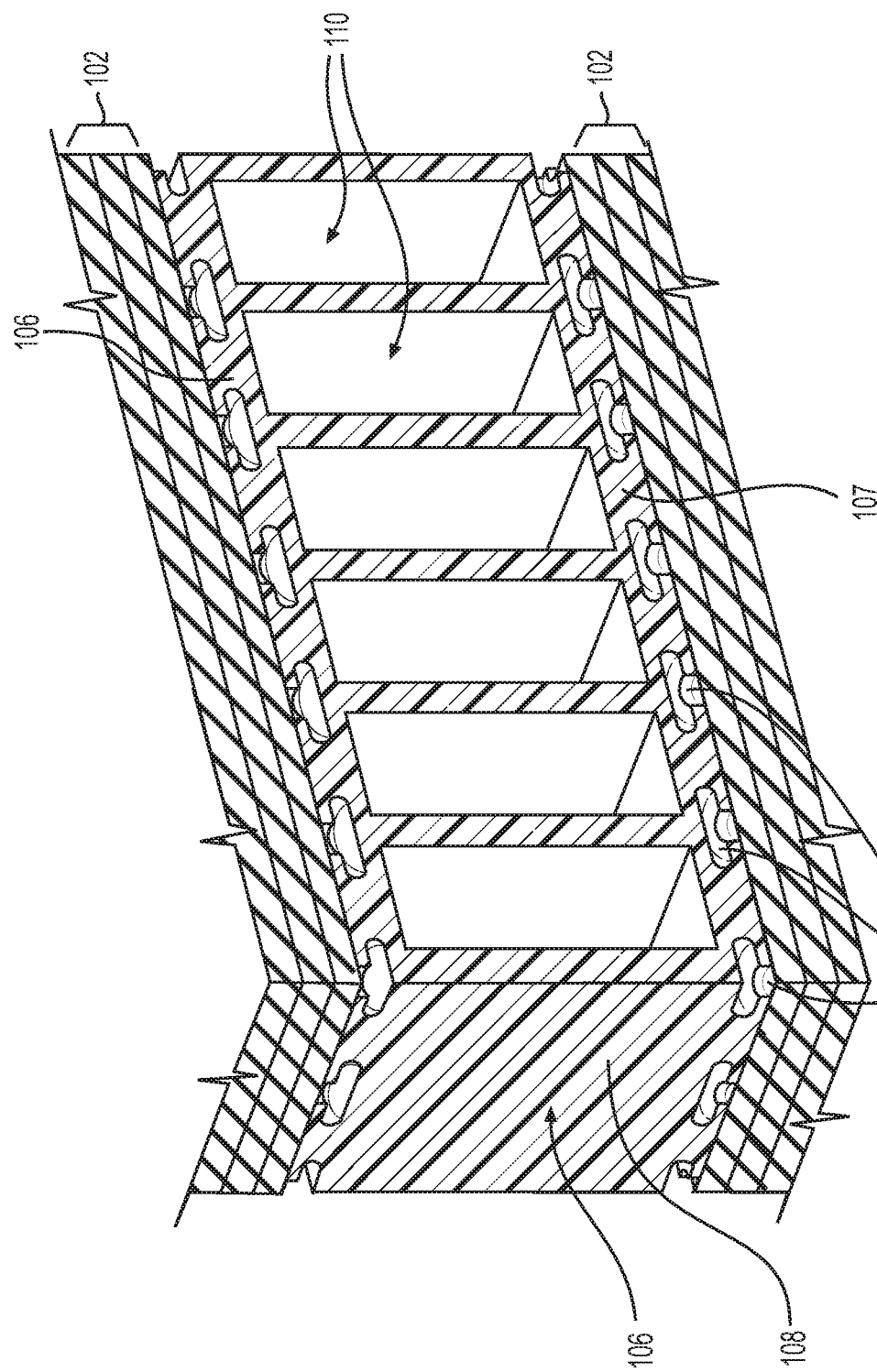
FIG. 1 is a perspective view showing an article created according to the processes disclosed herein.
Figure 2:
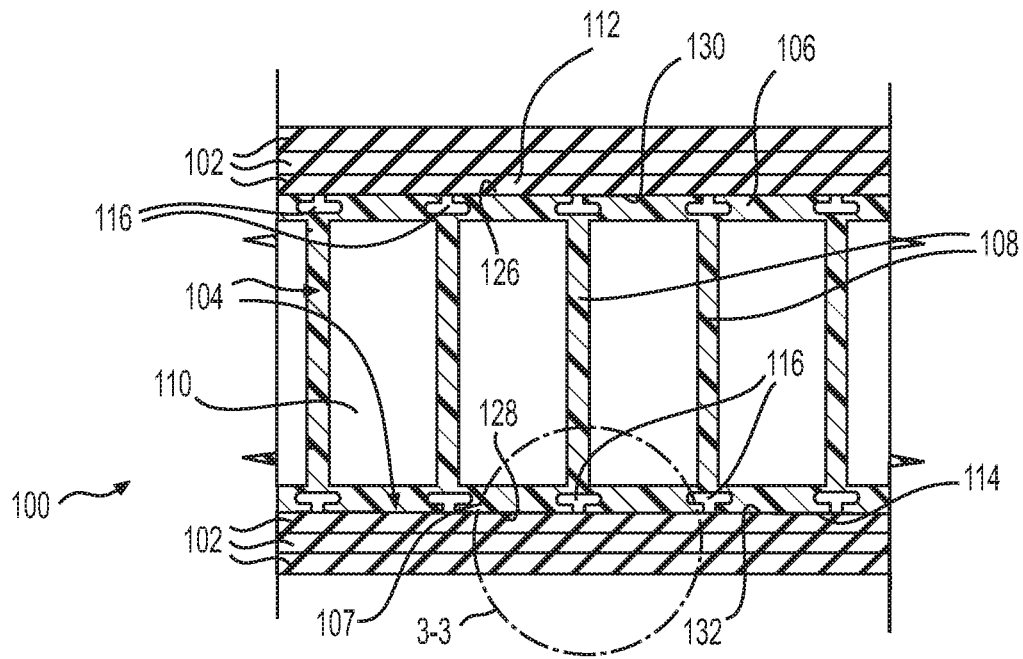
FIG. 2 is a front view cross sectional view taken at Section 2-2 shown in FIG. 1.

Embodiments of the present invention provide systems and a method for creating a bond between a first kind of material, where the first material is able to support, contain, or be saturated with a flowable, curable substance, and a second material, the second material being of the sort that is capable of having shapes formed therein.

In one embodiment, the first material could be stacked plies of carbon fiber. However, these plies could be made of fiberglass, an aromatic polyamide "aramid", a poly-prara-phenylene terephthalamide material (such as Kevlar® by E.I. du Pont De Nemours and Company of Wilmington, Del.). These materials may be woven sheets of fiber, or sheets of uni-directional fibers, paired with a polymeric matrix. The polymeric matrix can include any suitable thermoset or thermoplastic resin. Exemplary resins include epoxy, vinyl ester, cyanide ester, bismaleimide, phenolic, polyetheretherketone (PEEK), polyetherketone (PEK), and the like. These resins may be applied to the dry fibers in a "pre-preg" format, or introduced in-situ as a wet-layup or through one of a Resin Transfer Method (RTM)/Vacuum Assisted Resin Transfer Method (VARTM) processes. Alternatively still, the first material could comprise only one sheet, or some non-saturated material to which the flowable curable adherent is applied. In such instances, the first material would likely be one to which the flowable, curable adherent is more readily bonded to than the second material.

An aspect of the disclosed embodiments is that some configuring is done to the second material (e.g., a substrate) to increase bond strength when the first material is attached.

In one embodiment, the disclosed method involves a special configuration made into a structure constructed of the second material that has a surface that is configured to include resin-receiving openings.

A more specific embodiment of the methods disclosed is shown in FIGS. 1-4. Referring to the figures, it can be seen that a system 100 involves the bonding of carbon fiber panels 102, e.g., the first material, to a sandwiched substrate 104, e.g., the second material. In order to increase the bonding strength, the substrate core 104, which includes and upper shelf portion 106 supported above a lower shelf portion 107 by a plurality of substantially vertical supports 108, is configured in a way that promotes bond strength. More specifically, the core 104 is configured such that it includes intermittent, captive, voids. In one embodiment, these voids/apertures 116, or alternatively other irregularly shaped openings, are formed into surfaces on the substrate which are intended for bonding, using an additive manufacturing process. These sorts of processes involve, in embodiments, the creation by layering, gradually forming, or growing materials to create some form of article. One example of an additive manufacturing process that might be used is the growth of materials into an article using a 3D-printing process.

Even more specifically, in some embodiments, the core/substrate 104 is grown according to a modeling process. In some embodiments, the process used is a Fused Deposition Modeling (FDM) 3-D printing process. Those skilled in the art will know that FDM printers use a thermoplastic filament which is heated to its melting point, and then it is extruded one layer at a time according to a 3D-software rendering. Layer by layer, the printer builds a three-dimensional article, and once completed, passageways are defined into the bonding surfaces of the core that lead to intentionally-created voids. In other embodiments, a void can be formed from precut series of shapes cut into or otherwise formed into sequentially placed layers of fibrous composite materials. For example, the initial layers can be aperture free. Then, layers the next highest in the stack can be formed of sheets having vertically aligned apertures in the sheets that are relatively large. Then, above that, further applied layers can have relatively smaller holes that are vertically aligned above the larger holes below. The result is a void formed below a passageway (e.g., like the passageway 118 and void 120 shown in FIG. 3A, but formed of layers of composite material rather than grown according to a 3-D growth process).

In the embodiment shown in FIGS. 1-4, an article has been grown to include voids that have passageways 118 that are narrower than voided out spaces 110, which have been created in the form of pockets. The term "voids" when used in this application should not be limited to any particular shape, e.g., like the pockets shown in FIGS. 1-4, but instead is intended to mean that a space is created that provides some configuration enabling additional mechanical advantage against the pulling apart of or other similar failures of the bond. For example, it is possible that some configurations might include lateral extensions expanding out from a relatively inner portion of one or more passageways. The lateral extensions would then cause the mechanical resistance/holding force desired. Alternatively, the voids (and passageway for that matter) could have differently shaped cross sections. Further, the voids could be mere lateral extensions of the passageways made under the surface of the core. Additionally, the voids could be subsurface channels interconnecting a plurality of relatively inwardly-located portions of the passageways to create a network of resin-receiving interconnecting tunnels inside the core that once the resin is cured hold the core securely to the fiber-carbon layers.

In embodiments, the void can have a lateral dimension that is greater than a dimension existing in the passageway, creating a dimensional difference. Thus, when a bond is formed between the carbon fiber panels 102 and the bonding surface (e.g., surface 126) of the core, the introduction of the resin, when later cured, will at least be enhanced. This is because the hardened resin existing inside the void will be larger than the passageway, thus creating a retaining element, keeping the head of the cured material formed in the void contained so that it cannot be pulled out. Those skilled in the art will recognize that numerous other embodiments of the voids/passageways are possible.

It is also possible that voided spaces are alternatively formed by a drilling device (not shown) that is capable of initially entering with a tip having a relatively small diameter, and then expanding under the substrate core surface to bore out a void/pocket having a diameter larger than exists underneath the passage of entry. Other means for defining the voids 116 into the core 104 might include pressing shaped materials into a core/substrate material 104 and then chemically or otherwise dissolving those shapes leaving the desired configuration.

The 3-D printing method enables the formation of voids that have a cross-sectional shape shown in detail in FIG. 3. This void configuration greatly increases the pull-off strength in flatwise tension, as well as the strength in shear between the composite materials 102 and the core 104 once the article is cured.

This mechanical interlock provides a significant advantage over traditional surface prep methods by increasing the bond line adhesion at the interface defined by the top surface 126 of the upper shelf 106 and the engagement surface 130 on the bottom of the inner-most layer 112 of the top stack of sheets 102. Similarly, the voids 116 in the lower surface 128 of the lower shelf 107 enable secure bonding to the engagement surface 132 on the innermost layer 114 of the bottom stack of sheets 102.

Figure 3A:
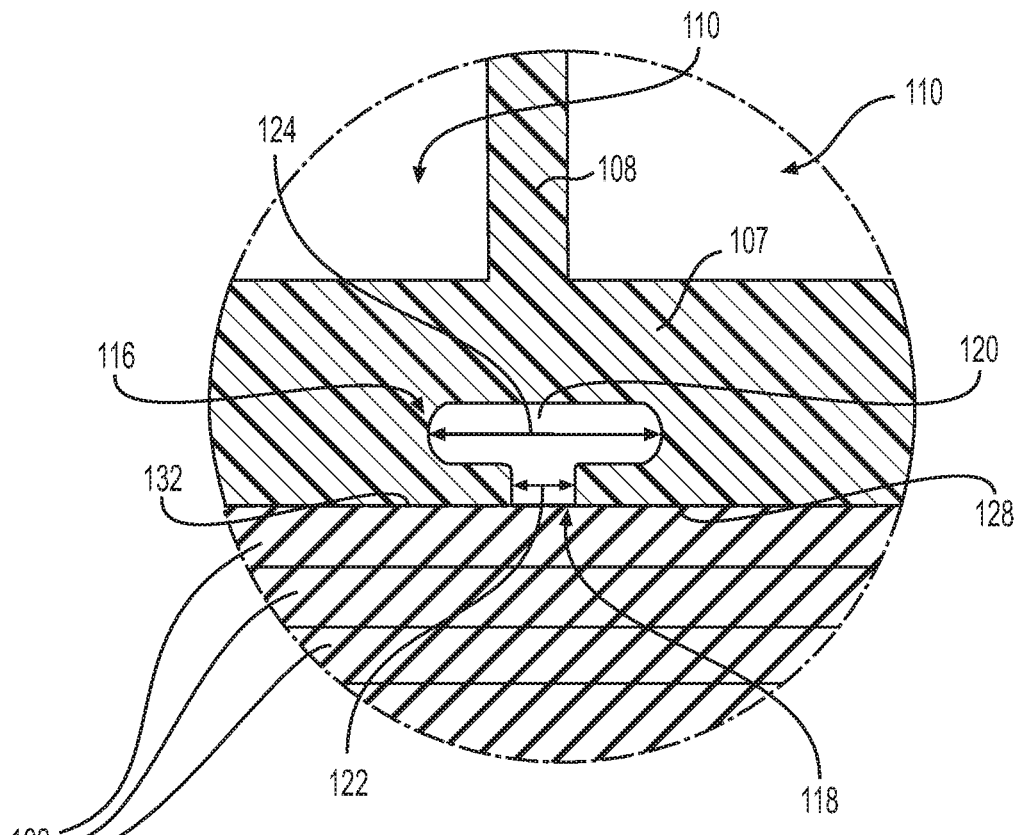
FIG. 3A is a detail 3-3 shown in FIG. 2.

Referring back to FIG. 3A, it can be seen that each void 116 has a passageway with an inlet 118 which allows for the ingress of resin during the layup process. The use of the term "passageway" as used herein should be interpreted broadly, e.g., meaning merely that it is an arrangement that allows for the flow of curable material into the void in the article formed of the second material (e.g., core 104) in some way. As can also be seen in FIG. 3A, the passageway 118 transitions into the void 120. In the disclosed embodiment, both the passageway 118 and void 120 are circular in cross section as can be seen in the view shown in FIG. 3B. FIG. 3B is an isolated view of a passageway 118 and void 120 defined into the core as they would appear being viewed from outside the core were the layers 102 to be removed. As can be seen from the figure, the dimension 116 of the void 120 that extends laterally outward to the greatest extent is considerably wider in geometry than is the outermost dimension 122 of the passageway. It is of course possible that these could have other shapes than those shown in FIGS. 3A and 3B and still fall within the scope of the disclosed embodiments. Referring back to FIG. 3A, it can also be seen there that void 120 has the dimension 124 that is greater than a dimension 122 in the port 118.

Figure 4:
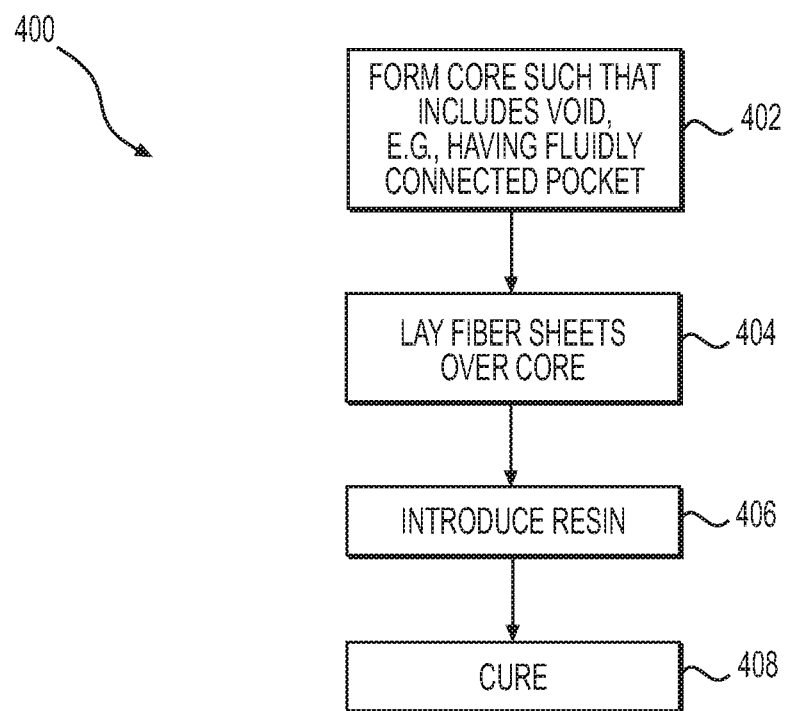
FIG. 4 is a flow diagram showing the methods in an embodiment of the invention.

FIG. 4 discloses an embodiment of a bond-creation process. Referring to the figure it can be seen that in a first step 402, a form core is created such that it creates a void. In embodiments, this void might be configured like the one shown in FIGS. 3A and 3B. Regardless, the void is adapted such that it is fluidly connectable from outside the core via some form of passageway.

In a next step 404, matter to be connected to the core, e.g., fiber sheets 102 in embodiments are placed on the top of the core 106 overlapping at least a a portion of the core that includes the fluidly-connected voids. In some instances, this will mean that only an outer margin of the carbon fiber ply 102 will be made to overlap the top of the core. E.g., where a person is creating a connection between two adjacent composite structures in order to create a larger article of some sort (e.g., an aircraft skin in some embodiments).

In a next step 406, after the carbon fiber is in position, the liquid curable material, e.g., in embodiments, a resin, is introduced as is a part of conventional composite manufacturing processes. Referring to the cross section of FIG. 3A, the resin, once the layers 102 are saturated, will flow through passageway 122 into the void 120.

In a next step 408, the article is cured. In embodiments where this occurs as a part of curing a composite product, the curing may occur in an autoclave after the layup is vacuum bagged. The autoclave introduces pressure and temperature, and the article is hardened. When this occurs, the resin that has seeped into the voids defined into the article are cured, creating a contained head that is held securely in the core.

Where two sides of the core 106 are intended for adherence, the core 106 is then flipped and the same process used to adhere the sheets 102 onto the other side of the core so that the completed article appears as shown in FIG. 1 (except that the voids 116 are filled with fluid and then hardened epoxy).

Figure 5:
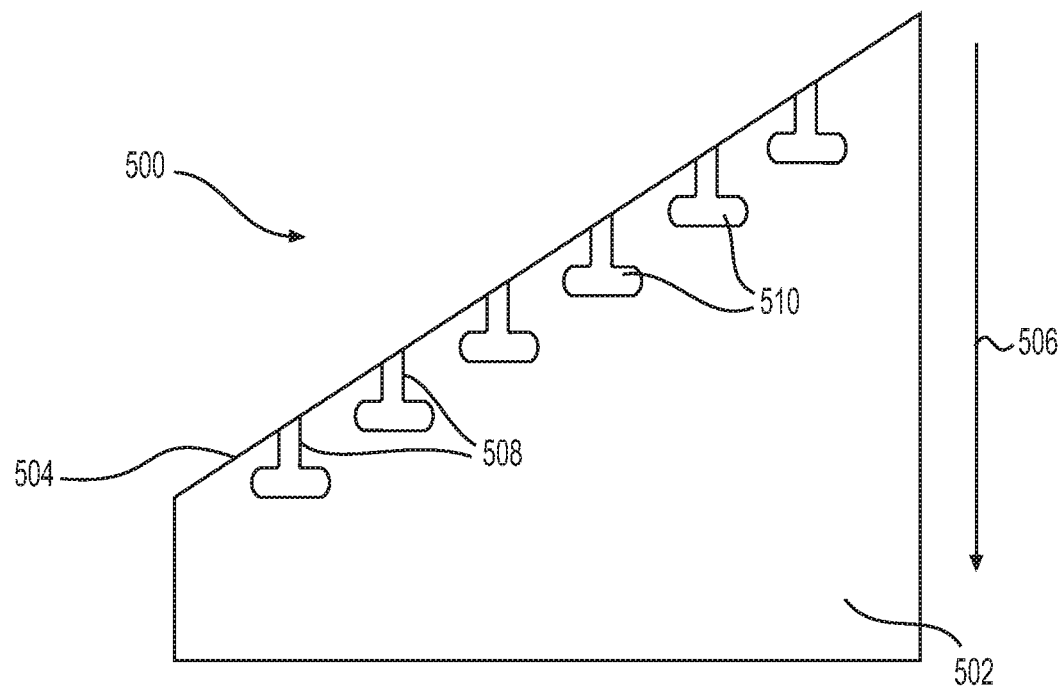
FIG. 5 shows an alternative embodiment where the substrate to be connected to the fiber layers is angled.

FIG. 5 discloses an embodiment where the substrate to which the composite layers are to be applied has an angled surface. As can be seen from the figure, a core 500 includes a body 502 that has an upper surface 504 that is angled. Assuming that that 3-d growth occurs according to a vertical reference vector 506, it can be seen that each of the passageways 508 and voids 510 are defined such that they have center axis' that are in parallel with the deposition vector. In other words, they each have an axis that is substantially parallel with the direction in which the material is being grown. One reason for this orientation is to avoid errors in growth of the passageways 508 and voids 510. In another possible embodiment, the center axis of the void 510 and passageway 508 would be substantially normal to the surface of the substrate.

Figure 6:
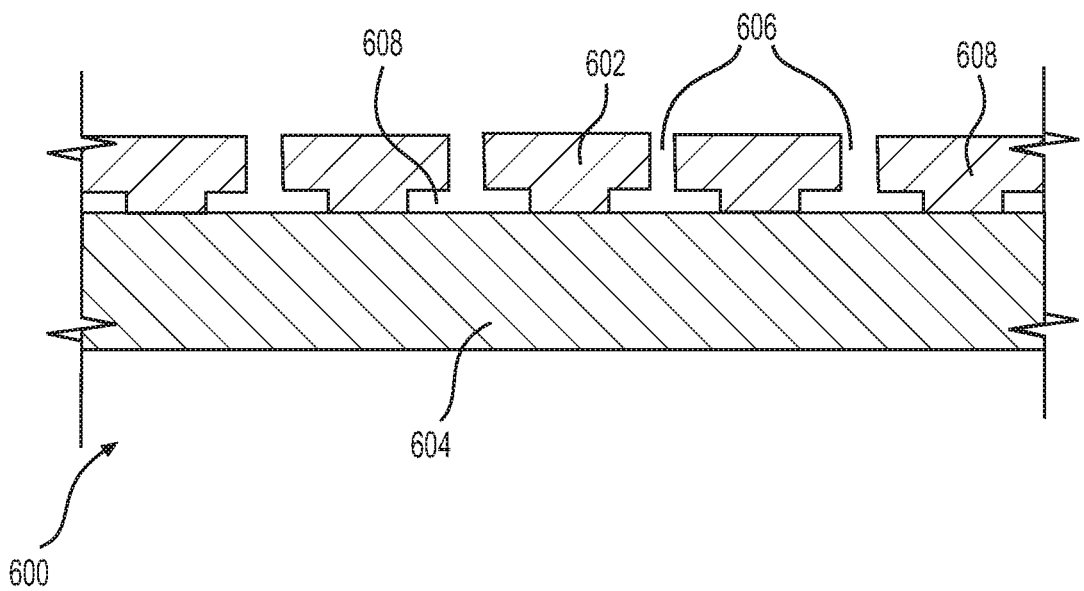
FIG. 6 shows an alternative embodiment where the core substrate is formed using a predrilled face sheet that is mounted onto a base.

FIG. 6 shows an alternative arrangement where an article 600 is comprised of a pre-prepared face sheet 602 that is adhered to a core base 604. Core base 604 could be comprised of a 3-D grown, or otherwise constructed material. The process is the same as discussed above in FIG. 4, except that in step 402, the article 600, instead of being grown as an integral unit, is instead formed by first pre-processing sheet 600. More specifically, the narrower passageways 606 are formed, as well as the relatively wider bores 608. Once the sheet 602 is adhered to the base 604, voids are formed by the wide bore sections 608 because they are enclosed by the upper surface of the base 604. The FIG. 6 arrangement may have value by simplifying the 3-D growth process, or eliminating it together because the sheet 602 and base 604 are able to be mechanically produced (e.g., by drilling) according to conventional processes.

In yet further embodiments, you could have two opposing surfaces, each opposing surface having resin receiving voids/pockets in it. More specifically, a flowable curable substance could be deposed between two opposing core surfaces (like surface 128 shown in FIG. 2). This would enable two-directional adhesion between the 3-D grown (or otherwise constructed) cores.

Those skilled in the art will recognize that these technologies have numerous applications outside the area of composite structures. For example, similar processes could be employed where the flowable curable substance is a thermoset or thermoplastic resin used in the adherence of structures.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:
1. A system for securing a composite material to a substrate comprising a substrate material, the system comprising:

an opening made into the substrate material, the opening transitioning into an internally-formed void formed underneath and through a surface of the substrate material;

the void having a lateral dimension that is greater than a dimension of the opening, thus creating a dimensional difference;

a bond formed between the composite and substrate materials, the bond being formed of a cured product of a flowable, curable fluid, the bond being at least enhanced by a retaining force between the composite material and the substrate, the retaining force being provided by the dimensional difference established when the fluid is cured.

2. The system of claim 1 wherein the bond is primarily held to the composite material by adhesive strength, and the bond is primarily held to the substrate material by the retaining force provided by the dimensional difference.

3. The system of claim 1 wherein the cured product of a flowable, curable fluid is comprised of the resin.

4. The system of claim 3 wherein the resin is a resin thermoset resin.

5. The system of claim 3 wherein the resin is a thermoplastic resin.

6. The system of claim 1 wherein the substrate material is a 3-D printed core.

7. The system of claim 1 wherein the opening transitions into the void via a passageway and the void has a cross-sectional dimension larger than a dimension of passageway such that the cured product is retained in the void after being cured.

8. The system of claim 7 wherein the substrate is an aircraft part that is constructed through an additive manufacturing process.

9. A fastening system comprising:
a printed article, the printed article being configured to define a first passageway into a first attachment surface to lead into an enclosed first void, the first void being defined into the printed article to be below the first attachment surface, the first void sized to create a void cross section in the first void that has a dimension greater than at least a portion of a cross sectional dimension in the first passageway;
a second article saturated with a cured first body of formerly flowable fluid, the first body extending through the first passageway into the first void, and establishing a retaining head in the first void.

10. The system of claim 9 comprising:
a second attachment surface of the printed first article configured to have a second passageway and a second void; and
a cured second body of formerly flowable fluid extending through the second passageway into the second void and establishing a hardened retaining head in the second void.

11. The system of claim 10 wherein a first plurality of voids and passageways are configured into the first attachment surface, and a second plurality of voids and passageways are configured into the second attachment surface, the voids in the first and second pluralities all including hardened retaining heads establishing bonds with the printed and second articles.

12. The system of claim 9 wherein the system is incorporated into an aircraft part.

13. The system of claim 9 wherein the printed article is a 3-D printed mass.

14. A core for bonding an edge of a first composite member to an edge of a second composite member, the core comprising:
a first plurality of pockets defined into and underneath a first surface of the core, each pocket in the first plurality of pockets being fluidly connected to the first surface via a respective passageway of a first plurality of passageways, each passageway in the first plurality of passageways having a passageway-cross-sectional dimension that is smaller than a pocket-cross-sectional dimension of of the first plurality of pockets;
a second plurality of pockets defined into and underneath a second surface of the core, the second surface being on an opposite side of the core from the first surface, each pocket in the second plurality of pockets being fluidly connected to the second surface via a respective passageway of a second plurality of passageways, each passageway in the second plurality of passageways having a passageway-cross-sectional dimension that is smaller than a pocket-cross-sectional dimension of each of the second plurality of pockets;
the first and second plurality of pockets, upon receiving a resin, retaining each of first and second surfaces to the first and second composite edges, respectively, upon curing of the resin.

15. The core of claim 14 wherein the first and second composite members are incorporated into an aircraft.

16. The core of claim 14 wherein the core is a 3-D printed article.

* * * * *